United States Patent [19]

Sakaguchi et al.

[11] Patent Number: 4,846,420

[45] Date of Patent: * Jul. 11, 1989

[54] MAGNETIC TAPE LOADING METHOD AND APPARATUS

[75] Inventors: Masaaki Sakaguchi; Mitsunobu Usui, both of Kanagawa, Japan

[73] Assignee: Fuji Photo Film Co., Ltd., Kanagawa, Japan

[*] Notice: The portion of the term of this patent subsequent to Nov. 8, 2005 has been disclaimed.

[21] Appl. No.: 157,663

[22] Filed: Feb. 19, 1988

[30] Foreign Application Priority Data

Feb. 19, 1987 [JP] Japan .................................. 62-34659

[51] Int. Cl.$^4$ ............................................. B65H 18/26
[52] U.S. Cl. ................................. 242/76; 242/67.1 R
[58] Field of Search .................... 242/76, 56 R, 67.1 R

[56] References Cited

FOREIGN PATENT DOCUMENTS 51642 3/1986 Japan .

Primary Examiner—Stuart S. Levy
Assistant Examiner—Steven M. DuBois
Attorney, Agent, or Firm—Sughrue, Mion, Zinn, Macpeak & Seas

[57] ABSTRACT

A method and apparatus for loading a magnetic tape into a cassette providing an improved tape winding appearance and improved total tape loading time. During winding, the pressure in the region surrounding the cassette into which the tape is being wound is reduced, while simultaneously a magnetic field is applied to the tape, at least in the vicinity of the tape winding body onto which the tape is being wound. Decompression is started substantially at the same time or slightly after the start of the tape winding operation, and the region is similarly returned to atmospheric pressure as the tape winding operation is being completed.

7 Claims, 7 Drawing Sheets

MAGNETIC TAPE LOADING METHOD AND APPARATUS

BACKGROUND OF THE INVENTION

The present invention relates to a magnetic tape loading method and apparatus for initially loading a magnetic tape of a predetermined length onto a tape winding body from a roll of "raw" magnetic tape of an article width, for rewinding a magnetic tape previously wound on a tape winding body to transfer the magnetic tape to another winding body, for loading a wide raw magnetic tape having a width larger than the article width, and for winding a plurality of raw article tapes cut from a wide raw tape having a width larger than the article width.

The known processes for manufacturing magnetic tapes, such as audio cassette tapes, video cassette tapes, memory tapes, broadcast-type video tapes, and the like include a process for winding a magnetic tape of a predetermined width onto a small-diameter tape winding body such as a reel, a hub or the like from a raw magnetic tape supply, a winding and rewinding process in which a magnetic tape which has been previously wound on a tape winding body is transferred from the tape winding body to another tape winding body, a process for winding a wide raw magnetic tape having a width larger than the article width, a process for winding a plurality of raw article tapes cut from a wide raw tape having a width larger than the article width, etc.

In the case where a magnetic tape is wound on a tape winding body using such winding or rewinding processes, various tape winding characteristics, such as vibration in the direction of tape thickness, vibration in the direction of tape width, and the like change according to the physical properties of the raw magnetic tape, the physical properties of the tape winding body, and the physical properties of the magnetic tape itself. As a result, a problem arises in regard to the winding appearance (winding condition) of the magnetic tape wound on the tape winding body. That is, winding difficulties arise so that the edges of the tape are uneven. Particularly, as the tape running speed during winding is increased, the tape edges become more uneven.

Of course, a magnetic tape in which the tape edges are uneven has a poor external appearance when the tape is placed in a magnetic tape cassette. Further, there arises a problem in that the tape edges can easily be damaged to thereby induce various problems, including deterioration of the electromagnetic conversion characteristics of the tape. Winding disorders become more serious as the density of recording is increased because, for example, a video magnetic tape must record both an audio signal and synchronizing signals in the vicinity of the tape edges.

Therefore, with the prior art magnetic tape manufacturing processes, all tapes had to be visually checked as to their winding appearance. This adds significantly to the total cost and time required in the manufacturing process.

To reduce the amount of manual inspection required, and for the purpose of improving the winding appearance, a method termed "decorative winding" as illustrated in FIGS. 1 and 2, has been employed for loading a magnetic tape.

In more detail, FIGS. 1 and 2 are schematic perspective views showing a tape winding body 2. In FIG. 1, a flexible endless belt 11 rotatably supported by rollers 12, 13 and 14 and formed of, for example, rubber, polyamide or the like, rotates together with a magnetic tape T so that the belt 11 elastically presses against the magnetic surface of the tape relatively strongly in the radial direction of the tape winding body 2 to thereby correct the winding appearance of the magnetic tape T. As shown in FIG. 2, a belt 15 formed of relatively soft unwoven fabric or the like is provided between a flange of a part of the tape winding body 2 and the edge of the magnetic tape T. While the belt 15, which is fed from a coiled belt supply roll 16, is wound through rollers 17 or the like onto a belt take-up roll 18 slowly at a constant speed, the belt 15 presses against one of the side edges of the tape relatively strongly to correct the winding appearance.

However, in either case, because the belt is in direct contact with the magnetic tape, dropout problems arise due to stripping of the magnetic layer caused by the unwoven fabric fiber or the like, deformation of the tape due to unsuitable pressure, and damage to the tape edges. Due to these problems, the original purpose of decorative winding often cannot be attained. Furthermore, the decorative winding mechanism has problems in regard to cost and maintenance.

Recently, a magnetic tape loading apparatus has been proposed, as shown in FIG. 3, in which the magnetic tape T is wound onto a take-up reel 40 composed of a winding core 41 and a flange 42. At least one magnet 31 is disposed opposite to the site where the magnetic tape T is to be wound, arranged symmetrically with respect to the flange 42 and in the vicinity of winding driving shaft 30 detachably connected to the winding core 41. (See Japanese Laid-Open Patent Application No. 51642/1986.)

However, with the magnet 31 surrounding the shaft 30, the winding appearance in the inner portion of the tape near the winding core 41 is inferior to that in the outer portion of the tape. Moreover, the form of the magnet 31 is limited by the shaft 30. That is, the magnet 31 must be shaped like a doughnut. The direction of the magnetic force lines is thus not constant in the inner portion of the tape near the center of the reel 40, and the density of magnetic flux in that area becomes low. Accordingly, in the initial step of the winding process, the force attracting the magnetic tape T toward the flange 42 is unstable and weak. Particularly, the tape behavior at the beginning of the winding operation is very poor. In addition, in the case where the amount of friction between adjacent wound parts of the tape is large, a problem arises in that the effect of the magnet cannot be obtained if the magnetic force acting on the magnetic tape is not large. Accordingly, to correct for this problem, the size of the magnet must be large or, in the case of an electromagnet, the drive current applied to the magnet must be increased. Further, the tape winding speed range over which a good winding appearance can be obtained is limited.

Still further, a so-called "decompression winding method" has been proposed in which the loading apparatus is surrounded by a decompression chamber to reduce the ambient pressure below atmospheric pressure during tape winding. This method recognizes the fact that, when the magnetic tape is wound on the tape winding body, accompanying air is rolled up together with the tape, and the action of the air interposed between the winding layers causes the tape to slide in the direction of the tape width. Generally, the adverse influence of the air on the winding appearance becomes more remarkable as the tape winding speed is increased. Accordingly, the tape winding speed can be increased using the decompression method.

According to the aforementioned decompression winding method, as clearly shown by the tape speed curve and the decompression level curve in the graph of FIG. 4, winding of the tape is carried out between $t_1$ and $t_2$ (main decompression area) where the pressure level of the decompression chamber must be maintained at less than a predetermined value. In other words, the winding of the tape cannot be carried out in the time period between $t_0$ and $t_1$ where the decompression level is not sufficient, and similarly in the interval between $t_2$ and $t_3$ where the decompression level is reduced, because the amount of decompression in those periods is too small to obtain a good winding appearance. Accordingly, the total time required for winding the tape is increased by the sum of the time between $t_0$ and $t_1$ and the time between $t_2$ and $t_3$. This causes a problem in manufactirng efficiency.

SUMMARY OF THE INVENTION

In view of such circumstances, an object of the present invention is to provide a magnetic tape loading method and apparatus in which a magnetic tape can be smoothly wound on a tape winding body, that is, wound without variations in the physical properties of the tape.

Another object of the invention is to provide a magnetic tape loading mehtod and apparatus in which deterioration of the tape quality caused, for example, by mechanical contact with the tape, as occurs in the prior art decorative-winding method, is eliminated and in which the efficiency and ease of operation of the loading process are improved.

A further object of the invention is to provide a magnetic tape loading method and apparatus in which the winding appearance of the tape is greatly improved, even in the case of so-called in-cassette type loading in which there has heretofore been no effective way of improving the winding appearance.

The foregoing and other objects of the invention have been attained by a magnetic tape loading method in which, when a magnetic tape is to be wound on a tape winding body, at least a region surrounding the tape winding body is decompressed while magnetic field is applied to the magnetic tape at least in the vicinity of the tape winding body, wherein decompression is started substantially at the same time as or after the start of the tape winding operation, and in which a main decompression area of the decompression level is substantially synchronized with at least a main speed area of the tape winding speed.

Further, the invention can be practiced by an apparatus which enables the above mehtod to be carried out, specifically, a magnetic tape loading apparatus for loading a magnetic tape on a rotating winding body, wherein the apparatus comprises at least one magnet for generating a magnetic field at least in the vicinty of the tape winding body, decompression means for decompressing at least a region surrounding the tape winding body, and control means for substantially synchronizing a main decompression area of a decompression level with a main speed area of a tape winding speed.

DESCRIPTION OF THE PREFERRED EMBODIMENTS

Preferred embodiments of an apparatus by which the inventive method can be realized will be described in detail hereunder.

Figure 6:
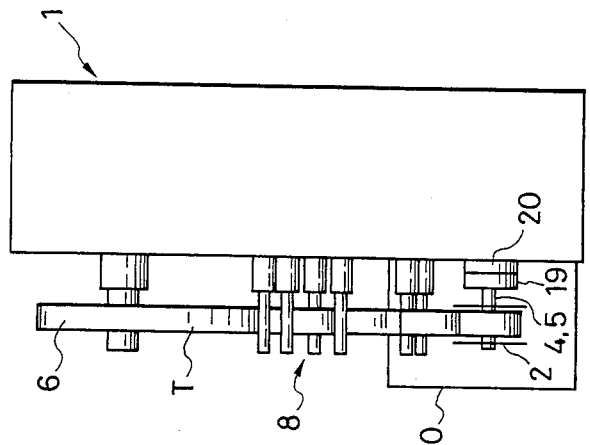
FIG. 6 is a schematic side view thereof.
Figure 5:
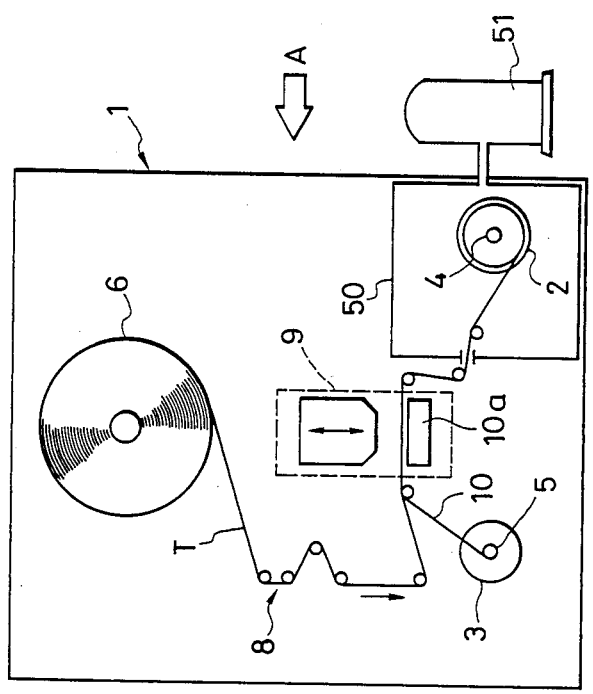
FIG. 5 is a schematic front view of a preferred embodiment of a tape loading apparatus constructed according to the present invention.

FIG. 5 is a schematic front view of a preferred embodiment of a magnetic tape loading apparatus 1 constructed according to the invention, and FIG. 6 is a side view taken in the direction of an arrow A in FIG. 5. For example, the loading apparatus 1 can be used in an open-reel winding method for winding a magnetic tape T on a pair of tape winding bodies 2 and 3 (hereinafter referred to as "tape reels") to be incorporated in a video cassette.

The operation of the loading apparatus 1 will now be described in detail.

At first, the tape reels 2 and 3 are connected to each other through a leader tape 10 of a predetermined length (illustrated by half in FIG. 5). After the tape reels 2 and 3 are mounted on respective shafts 4 and 5 to be rotationally driven in the apparatus 1, the leader tape 10 is cut about at its midpoint. The cut end of the part of the leader tape 10 connected to the tape reel 2 is bonded through a bonding tape or the like to a forward end of a raw magnetic tape 6. The magnetic tape T is wound through a predetermined length on the tape reel 2 and then is cut off, whereafter the cut end of the magnetic tape T wound on the tape reel 2 is bonded to the other end of the other part of the leader tape 10 connected to the tape reel 3.

The cutting of the leader tape 10 and the magnetic tape T and the bonding between the leader tape 10 and the magnetic tape T are carried out by a cutting and bonding device 9, which includes a tape end holding member, a cutter, a bonding tape, etc. The magnetic tape T, fed from the supply of raw tape 6, is wound on the tape reel 2 through a path 8 defined by guide pins and guide rollers.

An important aspect of the apparatus according to the invention relative to the mounting portion of the tape reel on which the magnetic tape T is wound. In accordance with this aspect of the invention, a magnet 19 is provided in the vicinity of the tape reel 2 disposed within a decompression chamber 50 connected to a vacuum pump 51. (The cutting and bonding device 9 and the vacuum pump 51 are now shown in FIG. 6 for clarity of illustration.)

Figure 7:
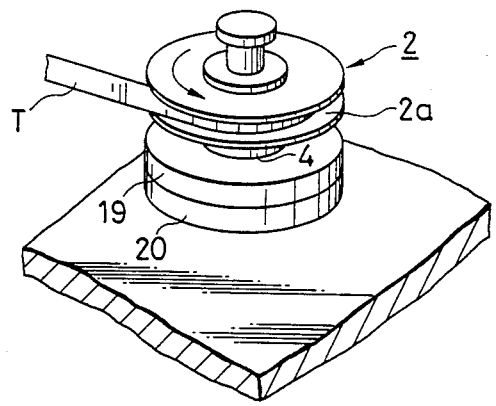
FIG. 7 is an enlarged perspective view showing the vicinity of a tape reel depicted in FIG. 6.

Although the form of the magnet 19 is not limited, the magnet 19, for example, may be shaped like a doughnut, as shown in FIG. 7, and attached to a body (front panel) of the apparatus by a nonmagnetic support 20 in such a manner that the magnet 19 surrounds the shaft 4. Accordingly, the magnetic tape T to be wound on the tape reel 2 is attracted by the action of the magnet 19 so that the magnetic tape T can be wound on the tape reel 2 while contacting a flange 2a. The magnet 19 may be a permanent magnet or an electromagnet.

The decompression chamber 50 is formed so that the tape reel 2 can be mounted/demounted without hindrance. Preferably, the decompression chamber 50 is formed so that smooth tape running, air-tightness and the like can be suitably maintained in its slit-like entrance portion through which the magnetic tape T enters the decompression chamber 50. Further, the decompression chamber 50 is made as small in inside volume as possible to thereby realize rapid decompression.

Figure 8:
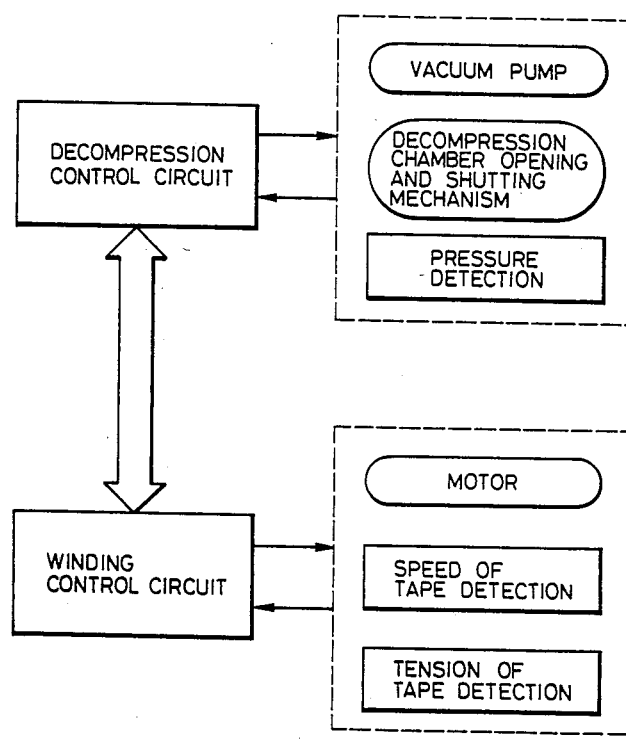
FIG. 8 is a block diagram showing the operation of the loading apparatus depicted in FIG. 6.

The shaft 4 for rotating the tape reel 2 is connected to a motor (not shown). The rotational speed of the shaft 4 and the decompression level of the decompression chamber 50 are suitably controlled by a control unit including a winding control circuit for controlling the rotational speed of the reel 2 and a decompression control circuit. As shown in the block diagram of FIG. 8, the decompression control circuit detects the pressure of the decompression chamber 50 to thereby control the vacuum pump 51, a decompression chamber opening and shutting mechanism, etc., based on the detected results. On the other hand, the winding control circuit detects the speed and tension of the tape to thereby control the driving device, such as a motor or the like, which effects the tape winding, based on the detected results. Further, signal transmission is carried out between the decompression control circuit and the winding control circuit so that the tape speed and the decompression operation are substantially synchronized with each other.

For example, the control sequence for the tape speed and the decompression can be carried out as follows.

Figure 9:
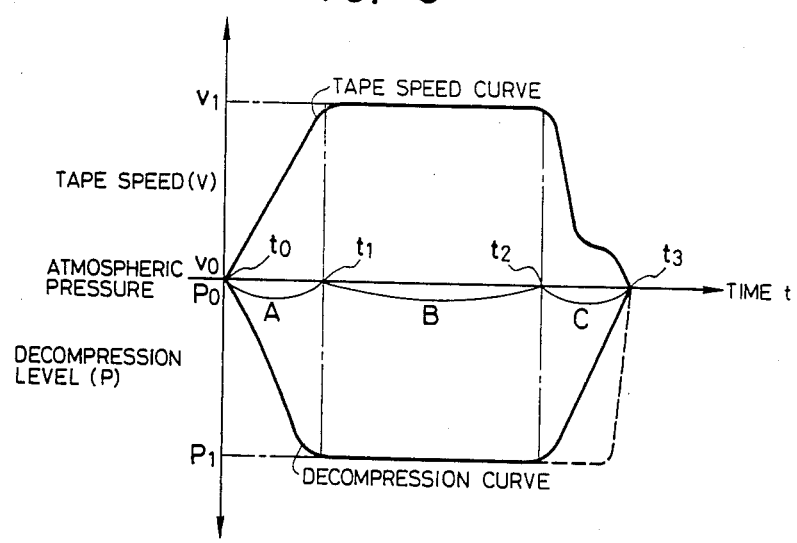
FIGS. 9, 10, 11 and 12 are graphs showing respective patterns of tape speed and decompression.

As shown in FIG. 9, the decompression starts at about the same time as tape winding or even just after the start of tape winding. The decompression level is controlled to reach the main decompression level $P_1$ at the time $t_1$ when the tape winding speed V reaches the tape speed $V_1$ of the winding main speed area or just before the time $t_1$. In an interval A where the winding of the tape starts, the winding appearance of the tape is maintained good by the action of the magnetic force of the magnet 19. In other words, the action of the magnetic force alone is sufficient to make the winding appearance good because the tape speed is low when the decompression level is low.

In the next internal B where the tape speed V is held at the tape speed $V_1$ of the winding main speed area until the time $t_2$, the decompression level is maintained at the decompression level $P_1$ of the main decompression area. In the interval B, very high speed winding, which could not be done in the prior art apparatus, can be realized by the combined action of the magnetic force and decompression. After the time $t_2$, the tape speed is reduced to stop the tape (in interval C) and thereby complete the tape winding operation. In the interval C, the decompression level may be reduced (as shown by solid line in FIG. 9) at about the same time as the tape speed is reduced. In the case where the decompression chamber is opened to atmospheric pressure, the decompression level can be rapidly reduced. In this case, the decompression level may be held at the main decompression level $P_1$, as shown by a broken line in FIG. 9, until just before the winding operation is completed at the time $t_3$. Further, a good winding appearance can be obtained substantially by the action of the magnetic field in the interval C in the same manner as in the interval A.

As described above, by use of the combined action of the magnetic field and decompression as in the present invention, the drawbacks of the prior art are eliminated and smooth tape winding obtained from start to finish of the winding operation. Accordingly, a very good winding appearance is assured. Further, very high speed loading can be realized. In addition, the loss of time in the prior art decompression winding method is eliminated to thereby improve the manufacturing efficiency of the apparatus and method.

Figure 10:
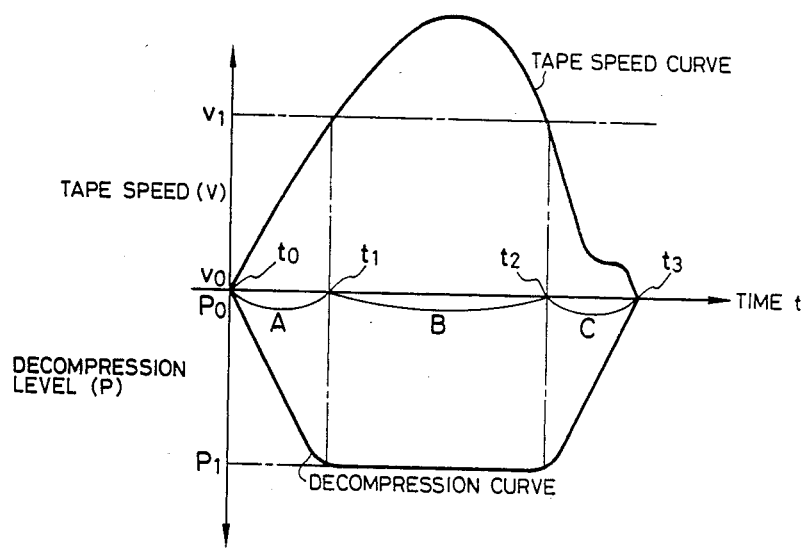
Figure 11:
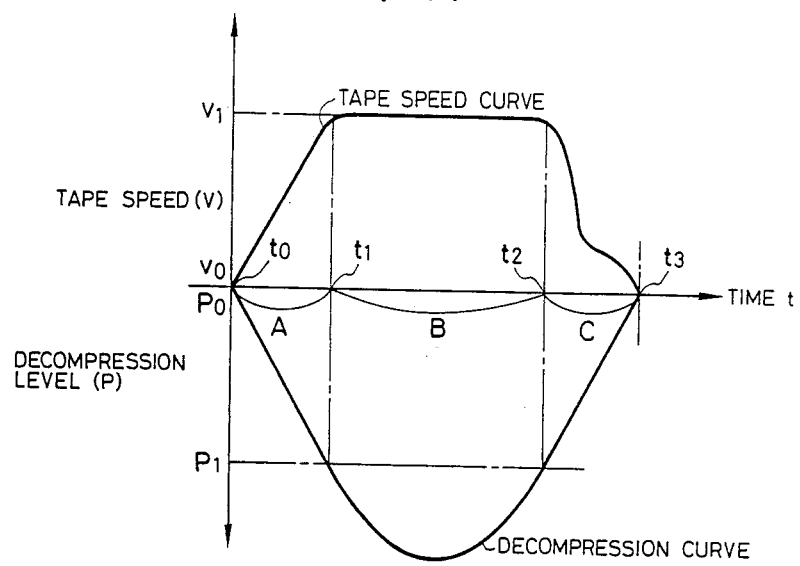
Figure 12:
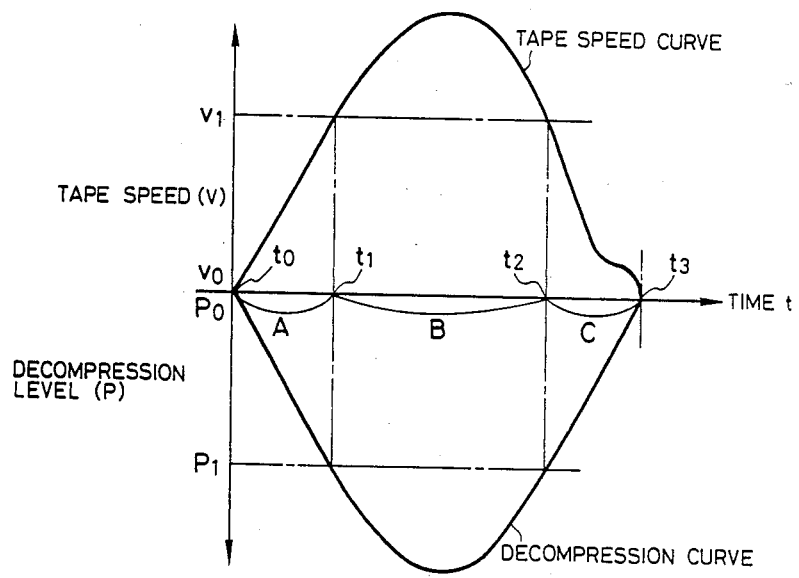

The present invention is not limited to the specific tape speed curve and decompression curve described above, and is not limited to the specific embodiment shown in FIG. 9. For example, modifications can be made as shown in FIGS. 10, 11 and 12. The decompression curve of FIG. 10 is similar to that of FIG. 9, but in the tape speed curve of FIG. 10 the tape speed is not constant in the interval B, and a curve is drawn for the interval B based on the extension lines of acceleration and deceleration.

The tape speed curve of FIG. 11 is similar to that of FIG. 9, except that in the decompression curve of FIG. 11 the decompression is not constant in the interval B and is kept higher than a predetermined decompression level. The tape speed curve of FIG. 12 is similar to that of FIG. 10, and the decompression curve of FIG. 12 is similar to that of FIG. 11.

The term "winding main speed area of the tape speed" as used herein means the area of the tape speed not less than a specific speed ($V_1$). The specific speed $V_1$ is suitably determined by physcial properties of the tape, such as the thickness of the magnetic tape, the tape material, the decompression level, the strength of the magnetic field, and other conditions. The term "main decompression level" as used herein means the area of decompression not less than a specific decompression level ($P_1$). The specific decompression level $P_1$ is also suitably determined by the physical properties of the tape, such as the thickness of the magnetic tape, the tape material, the tape speed, the strength of the magnetic field, and other conditions. Accordingly, in the case where a standard magnetic tape in a standard magnetic tape cassette such as a BETA (tradename) or a VHS (tradename) cassette or the like is to be loaded, it is possible for the tape speed in the winding main speed area to be not less than about 10 m/sec and the pressure in the main decompression area to be about half atmospheric pressure.

Although the aformentioned embodiment has been described with respect to the case where the invention is applied to open-reel winding type loading apparatus, the invention is not limited to this specific embodiment and is also applicable, for example, to an in-cassette winding type loading apparatus.

Figure 14:
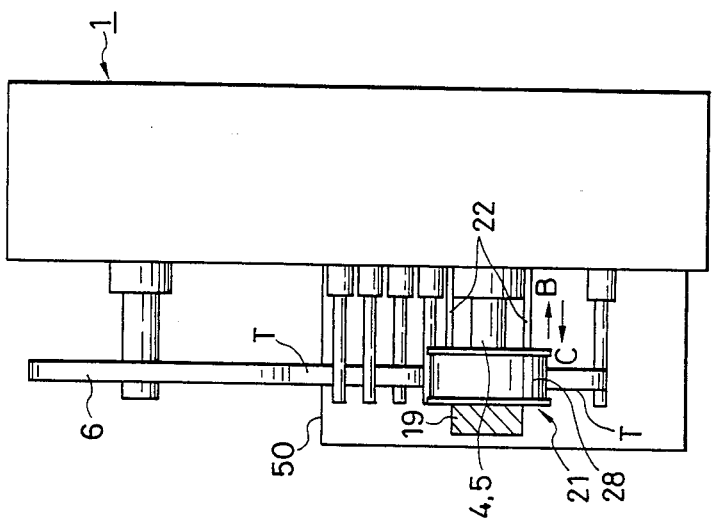
FIG. 14 is a schematic side view thereof.
Figure 13:
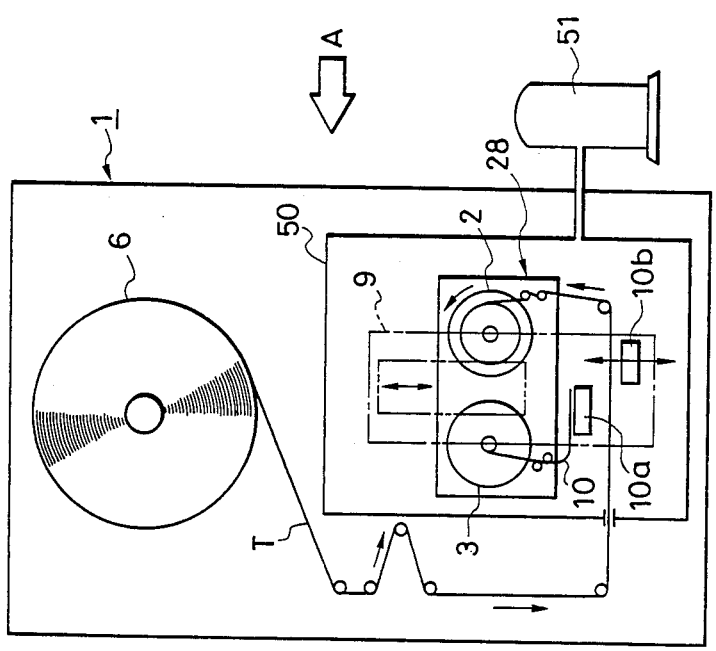
FIG. 13 is a schematic front view of another embodiment of the tape loading apparatus of the present invention.

FIG. 13 is a schematic front view of another embodiment of the invention, namely, an embodiment used with an incassette winding type magnetic tape loading apparatus, and FIG. 14 is a side view taken in the direction of an arrow A in FIG. 13. The loading apparatus 1 is used in a method for finishing a manufactured article by loading a magnetic tape T on a pair of tape reels 2 and 3 incorporated in a VHS- or BETA-type video tape cassette case.

The operation of this embodiment of the inventive loading apparatus 1 will now be described in detail.

The cassette case 28 containing the tape reels 2 and 3 connected to each other through a leader tape 10 of a predetermined length is attached to a cassette holder 21 of the apparatus 1 and is held by the holder 21. Next, for example, the holder 21 moves through movable shafts 22, in the direction of an arrow B, so that drive shafts 4 and 5 are respectively fitted into the tape reels 2 and 3 from the lower side thereof. Under this condition, a guard panel (not shown) for closing a front portion of the cassette case 28 when the cassette is not in use is opened substantially in the same manner as in a general VTR cassette.

Thereafter, the leader tape 10 is pulled out and cut off about at its midpoint. The cut end of the part of the leader tape 10 connected to the tape reel 2 is bonded through a bonding tape or the like to a forward end of a raw magnetic tape 6. The magnetic tape T is wound through a predetermined length of the tape reel 2 and then is cut off, whereafter the cut end of the magnetic tape T wound on the tape reel 2 is bonded to the other end of the other part of the leader tape 10 connected to the tape reel 3. Then, the cassette holder 21 moves in the direction of an arrow C in FIG. 14 so that the guard panel is shut and, at the same time, the cassette case is released by the cassette holder 21. Thus, the cassette case can be removed by downward movement.

The cutting of the leader tape 10 and the magnetic tape T and the bonding between the leader tape 10 and the magnetic tape T are carried out by a cutting and bonding device 9 provided with tape end holding members 10a and 10b, a cutter, a bonding tape, etc. The magnetic tape T fed from the supply of raw tape is wound on the tape reel 2 through a path defined by guide pins and guide rollers. (The cutting and bonding device 9 and the vacuum pump 51 are not shown in FIG. 14 for clarity of illustration.)

The decompression chamber 50 connected to the vacuum pump 51 must of course at least be capable of accommodating the cassette holder. On the other hand, the magnet 19 for applying a magnetic field to the magnetic tape T is, for example, mounted at the upper (left in FIG. 14) side of the cassette holder 21. The form and size of the magnet 19 are not limited specifically as long as predetermined magnetic field can be applied to the magnetic tape T to be wound on the tape reel 2.

Of course, the decompression chamber 50 must have an opening-and-shutting structure so that the tape reel 2 can be mounted/demounted without hindrance. Further, the decompression chamber 50 should be constructed so that smooth tape running, air-tightness and the like can be suitably maintained in its slit-like entrance portion through which the magnetic tape T enters the decompression chamber 50.

The control unit may include a decompression control circuit for controlling the decompression level of the decompression chamber 50 and a winding control circuit for controlling the driving system, such as a shaft 4 and the like, to operate in the manner described above with respect to the previous embodiment. The control of the tape speed and decompression can be carried out in the same manner as illustrated in FIGS. 9 to 12.

Figure 1:
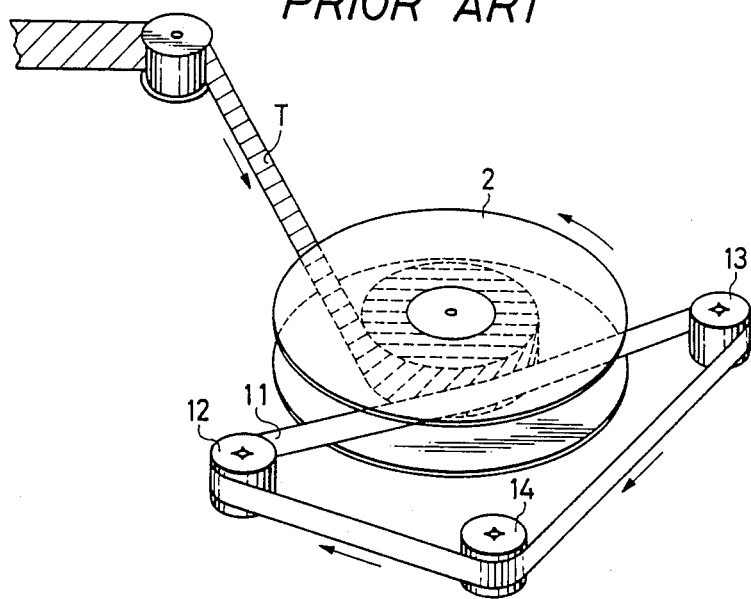
FIGS. 1 and 2 are schematic perspective views respectively showing a part of a conventional tape loading apparatus.
Figure 2:
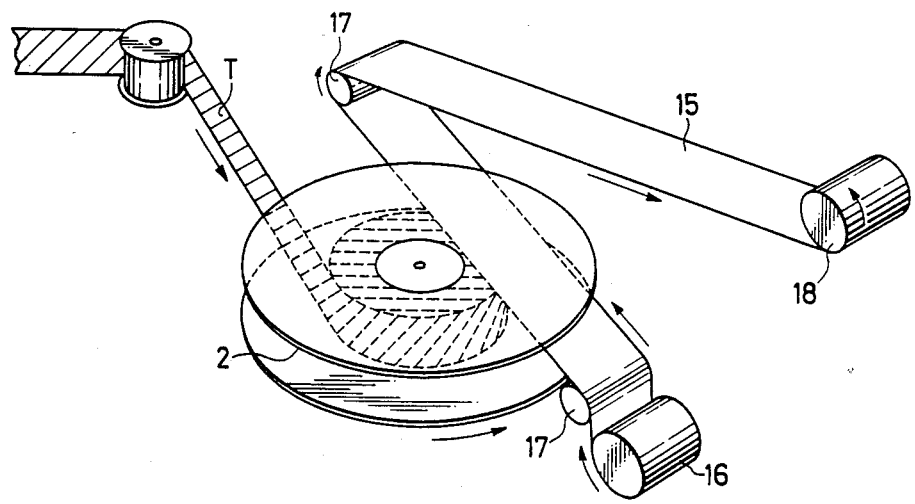
Figure 3:
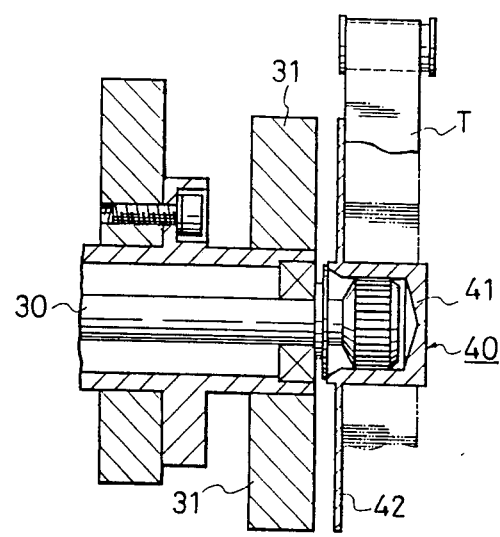
FIG. 3 is a partly sectional view of a conventional tape loading apparatus.
Figure 4:
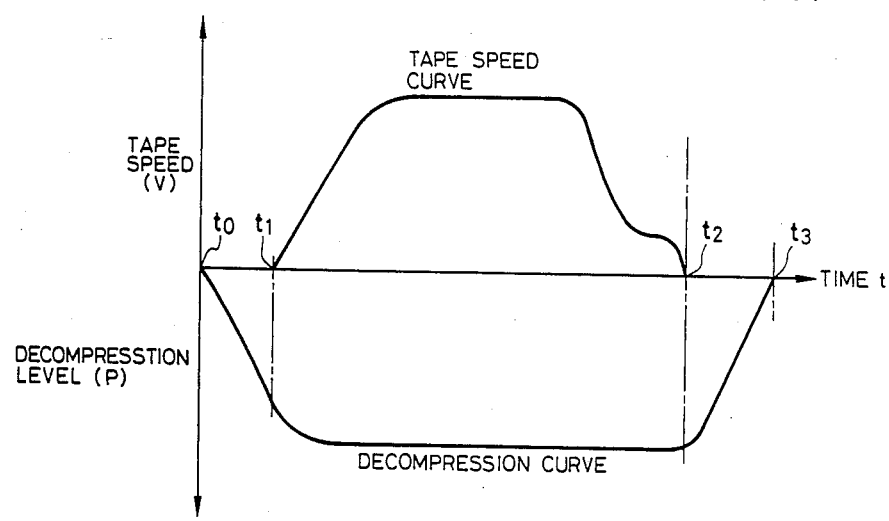
FIG. 4 is a graph showing patterns of tape speed and decompression according to a conventional tape loading method.

Accordingly, the same effects as described above can be obtained also in this embodiment. Generally, the decompression chamber 50 is somewhat larger, particularly in the case of an in-cassette winding type apparatus, compared to the case of an open-reel winding type apparatus. For this reason, in the prior art apparatus as shown in FIG. 4, the interval between $t_0$ and $t_1$ and the interval between $t_2$ and $t_3$ is made larger, or, in other words, the time required for reducing the pressure of the decompression chamber and the time required for returning the pressure to atmospheric pressure are large due to the size of the decompression chamber. However, according to the invention, such lost time in the loading operation is eliminated, and, at the same time, the tape winding speed can be remarkably increased. Consequently, in accordance with the invention, the overall manufacturing efficiency of the cassette is improved.

In the above-described embodiments, a description has been given relative to the case where the magnet 19 is fixed, but it is to be understood that the invention is not limited to these specific embodiments. That is, the amount 19 may be made movable. Further, the invention is equally applicable to the case where a wide raw tape is cut into a plurality of manufactured article tapes to be wound.

As described above in detail, according to the invention, during the winding of the magnetic tape, the magnetic force imposed by a magnetic field is applied to the magnetic tape in the direction of tape width, and the ambient air pressure is reduced by decompression while the magnetic tape is being wound. Accordingly, the loss of time encountered in the prior art apparatuses in reaching the desired decompresion level is eliminated by the action of the magnet to thereby shorten the total time required for the tape loading operation, compared with the prior art method using decompression alone. Further, the magnet can be reduced in size due to the combined action of decompression. In addition, a good winding appearance of the tape is assured.

Consequently, the invention provides a magnetic tape loading method and apparatus greatly improved in terms of the quality of the magnetic tape and the manufacturing efficiency of the tape loading process.

What is claimed is:

1. A magnetic tape loading method comprising: during the winding of a magnetic tape on a tape winding body, decompressing at least a region surrounding said tape winding body, and simultaneoulsy applying a magnetic field to said magnetic tape at least in a vicinity of said tape winding body, decompression being started substantially at the same time or subsequent to the staritng of the tape winding, and a main decompression area of a decompression level being substantially synchronized with at least a main speed area of a tape winding speed.

2. The magnetic tape loading method of claim 1, further comprising the step of substantially completely releasing decompression substantially at the same time or prior to the completion of tape winding.

3. The magnetic tape loading method of claim 1, wherein said step of applying said magnetic field comprises providing a magnet having a doughnut shape disposed around a winding shaft of said tape winding body.

4. A magnetic tape loading apparatus for loading a magnetic tape on a rotating tape winding body comprising: at least one magnet for generating a magnetic field at least in a vicinity of said tape winding body, decompression means for decompressing a region surrounding said tape winding body, and control means for starting decompression substantially at the same time or subsequent to the starting of tape winding and synchronizing a main decompression area of a decompression level with a main speed area of a tape winding speed.

5. The magnetic tape loading apparatus according to claim 4, further comprising means for holding a cassette case containing a pair of said tape winding bodies connected by a leader tape to each other, said holding means being disposed within a decompression chamber constituting said decompressing means.

6. The magnetic tape loading apparatus of claim 4, wherein said control means substantially completely releases decompression substantially at the same time or prior to the completion of tape winding.

7. The magnetic tape loading apparatus of claim 4, wherein said magnet has a doughnut shape and is disposed around a winding shaft of said tape winding body.

* * * * *